United States Patent
Takaiwa et al.

(10) Patent No.: US 11,367,884 B2
(45) Date of Patent: Jun. 21, 2022

(54) HYDROGEN SUPPLY SYSTEM, TRAIN AND HYDROGEN SUPPLY METHOD

(71) Applicant: TOYOTA JIDOSHA KABUSHIKI KAISHA, Toyota (JP)

(72) Inventors: Shigeki Takaiwa, Toyota (JP); Masahiro Yamakawa, Toyota (JP); Hideshi Mizutani, Toyota (JP); Kenji Umayahara, Miyoshi (JP); Takao Ozawa, Toyota (JP); Shigeyuki Suzuki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 330 days.

(21) Appl. No.: 16/534,041

(22) Filed: Aug. 7, 2019

(65) Prior Publication Data
US 2020/0067114 A1    Feb. 27, 2020

(30) Foreign Application Priority Data
Aug. 27, 2018 (JP) .............................. JP2018-158167

(51) Int. Cl.
*H01M 8/04* (2016.01)
*H01M 8/04082* (2016.01)
*B61K 11/00* (2006.01)
*B60L 50/70* (2019.01)

(52) U.S. Cl.
CPC ......... *H01M 8/04201* (2013.01); *B60L 50/70* (2019.02); *B61K 11/00* (2013.01); *B60L 2200/26* (2013.01); *H01M 2250/20* (2013.01)

(58) Field of Classification Search
CPC ...................................................... H01M 8/04
See application file for complete search history.

(56) References Cited

U.S. PATENT DOCUMENTS

2002/0029820 A1* 3/2002 Ovshinsky .............. B32B 15/01
141/110

FOREIGN PATENT DOCUMENTS

JP    2000095020 A    4/2000
JP    2006173068 A    6/2006

* cited by examiner

Primary Examiner — Jacob B Marks
(74) Attorney, Agent, or Firm — Dickinson Wright, PLLC

(57) ABSTRACT

A hydrogen supply system comprises a hydrogen station placed near a railroad track and configured to supply hydrogen to a moving body that is driven with a fuel cell used as an electric power source; and a train provided with a hydrogen tank and configured to run along the railroad track and transport hydrogen to the hydrogen station.

7 Claims, 9 Drawing Sheets

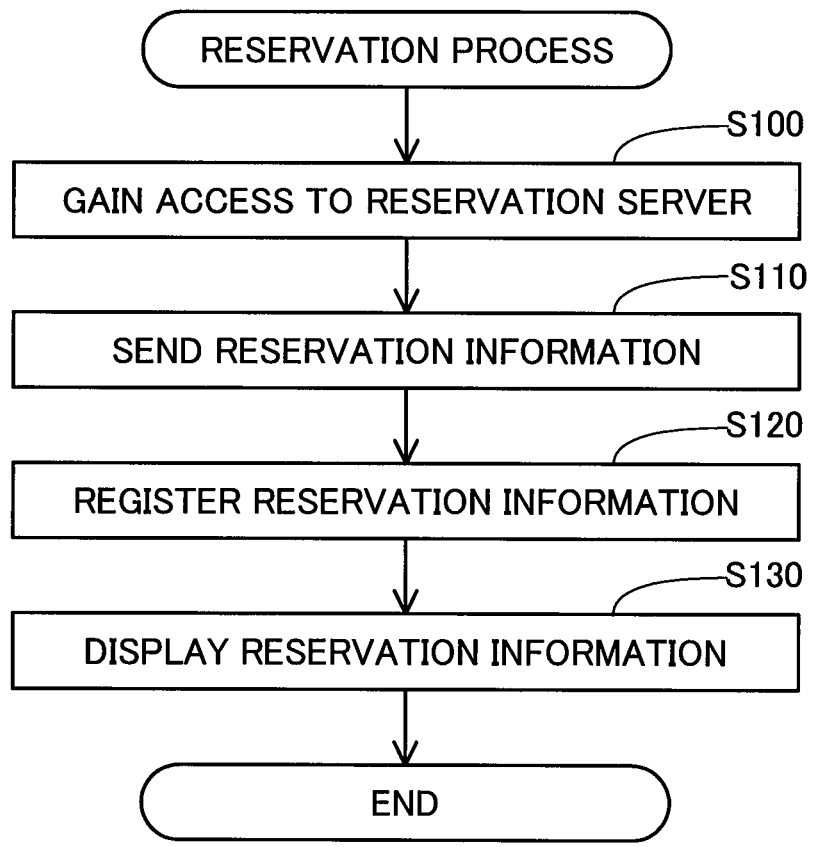

HYDROGEN SUPPLY SYSTEM, TRAIN AND HYDROGEN SUPPLY METHOD

CROSS REFERENCE TO RELATED APPLICATIONS

The present application claims priority from Japanese patent application No. 2018-158167 filed on Aug. 27, 2018, the entirety of the content of which is hereby incorporated by reference into this application.

BACKGROUND

Field

The present disclosure relates to a hydrogen supply system, a train and a hydrogen supply method.

Related Art

Patent Literature 1 discloses uses structures of an expressway or the like to lay pipes for supply of hydrogen from a hydrogen manufacturing site to a gas station and accordingly utilize the gas station as a stationary hydrogen station.
Patent Literature 1: JP2006-173068A
In order to achieve the stationary hydrogen station described in Patent Literature 1, however, there is a need to lay pipes from the hydrogen manufacturing site to the gas station. This requires large scale construction.

SUMMARY

According to one aspect of the present disclosure, there is provided a hydrogen supply system. This hydrogen supply system comprises a hydrogen station placed near a railroad track and configured to supply hydrogen to a moving body that is driven with a fuel cell used as an electric power source; and a train provided with a hydrogen tank and configured to run along the railroad track and transport hydrogen to the hydrogen station.

BRIEF DESCRIPTION OF THE DRAWINGS

FIG. 9 is a flowchart showing a reservation process performed in a reservation system.

DETAILED DESCRIPTION

A. First Embodiment

Figure 1:
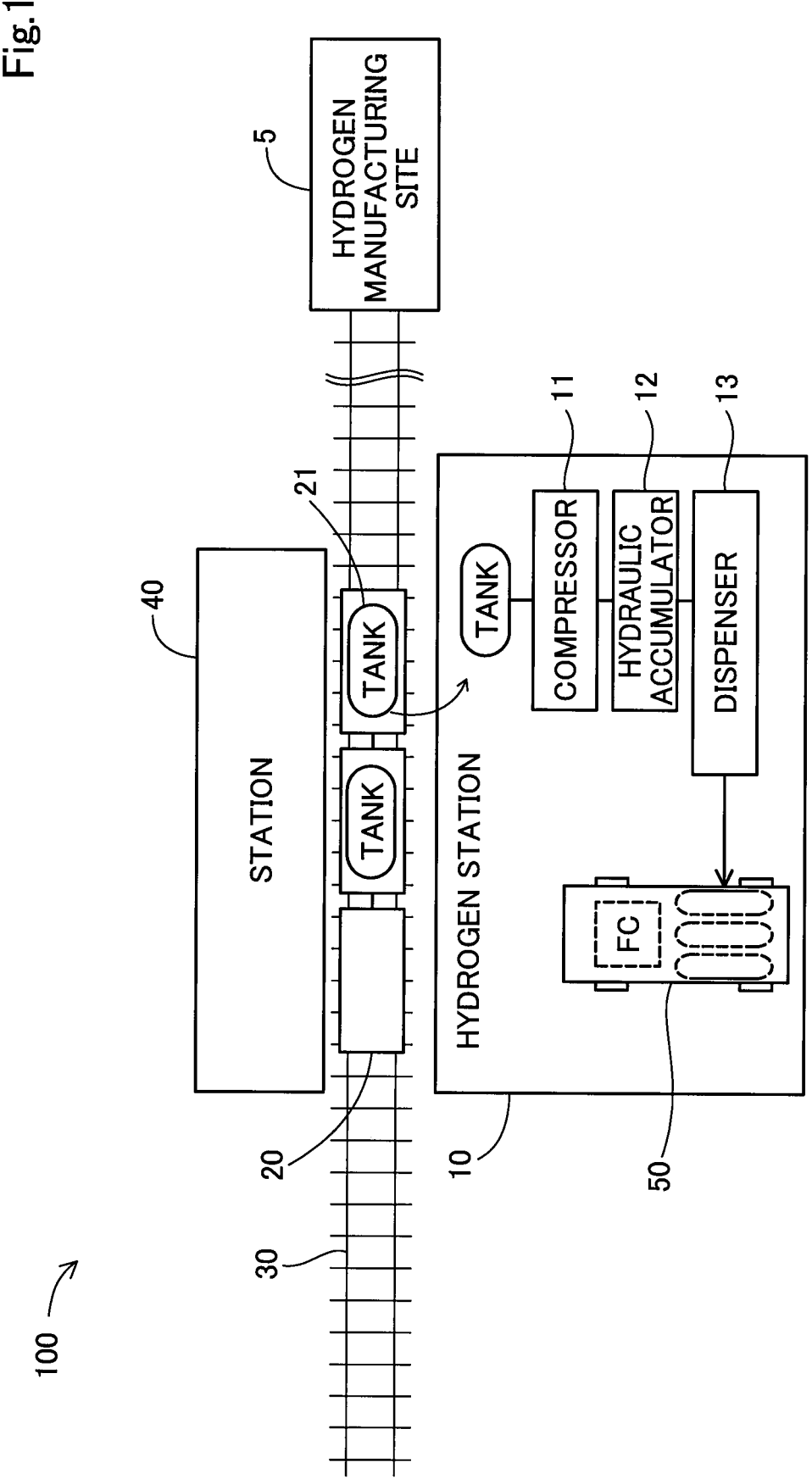
FIG. 1 is a diagram illustrating a hydrogen supply system according to a first embodiment.

FIG. 1 is a diagram illustrating a hydrogen supply system 100 according to a first embodiment. The hydrogen supply system 100 includes a hydrogen station 10 and a train 20. A schematic configuration of respective components is shown as a top view in FIG. 1.

The hydrogen station 10 is placed near a railroad track 30. In the description hereof, the hydrogen station 10 denotes a place where hydrogen is suppliable to a moving body 50 that is driven with a fuel cell serving as a power source. The moving body 50 driven with the fuel cell serving as the power source may be, for example, a fuel cell bus, a fuel cell taxi or a fuel cell private vehicle. According to the embodiment, it is preferable that a station 40 is equipped with the hydrogen station 10. This is because the fuel cell buses, the fuel cell taxies and the like described above are likely to gather at the station 40. This configuration accordingly assures efficient hydrogen supply.

The hydrogen station 10 of the embodiment is an off-site station. According to the embodiment, the hydrogen station 10 includes a compressor 11, a hydraulic accumulator 12, and a dispenser 13. The compressor 11 is configured to compress hydrogen that is transported by the train 20 from a hydrogen manufacturing site 5. The hydraulic accumulator 12 is configured to accumulate the hydrogen compressed by the compressor 12. The dispenser 13 is a device used to fill the hydrogen accumulated in the hydraulic accumulator 12 into the moving body 50. The dispenser 13 may be connected with a precooler that is configured to cool down the hydrogen that is to be filled into the moving body 50, prior to filling. The hydrogen station 10 is additionally provided with legally required structures, for example, fire walls and barriers, in addition to the compressor 11, the hydraulic accumulator 12 and the dispenser 13.

The train 20 has a hydrogen tank 21 mounted thereon and is configured to run along the railroad track 30 and transport hydrogen to the hydrogen station 10. Any of various types of tanks, for example, a cylinder type, a bundle type or a loader type, may be employed as the hydrogen tank 21. The hydrogen to be transported may be in a gas state or in a liquified state. The hydrogen may be converted into an organic hydride or another substance to be transported. The train 20 of the embodiment is an overhead line-type train or a train using an internal combustion engine such as a diesel engine as the power source.

The hydrogen tank 21 is unloaded from the train 20 to the hydrogen station 10 and is connected with the compressor 11. The hydrogen tank 21 that has been emptied at the hydrogen station 10 is loaded onto the train 20, in place of the unloaded hydrogen tank 21.

Figure 2:
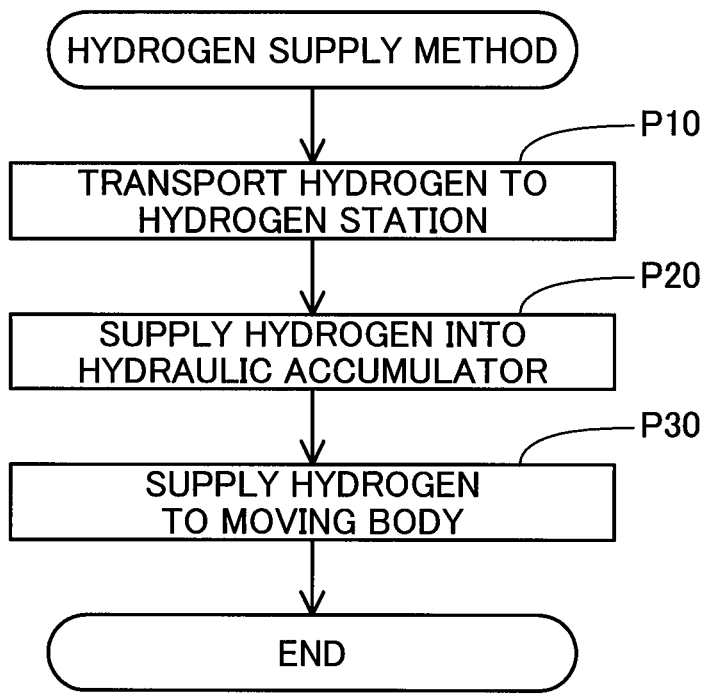
FIG. 2 is a process chart showing a hydrogen supply method according to the first embodiment.

FIG. 2 is a process chart showing a hydrogen supply method according to the first embodiment. Hydrogen is filled into the hydrogen tank 21 of the train 20 at the hydrogen manufacturing site 5 and is transported to the hydrogen station 10 by the train 20 (process P10). At the hydrogen station 10, hydrogen is supplied from the hydrogen tank 21 into the hydraulic accumulator 12 by the compressor 11 (process P20). At the hydrogen station 10, hydrogen is supplied to the moving body 50 (process P30).

The hydrogen supply system 100 of the first embodiment described above enables hydrogen to be transported to the hydrogen station 10 by the train 20. The hydrogen station 10 can thus be provided without requiring large-scale construction to lay pipes from the hydrogen manufacturing site 5 to the hydrogen station 10. According to the embodiment, the hydrogen station 10 is placed near the station 40 where the moving bodies 50 are likely to gather. This configuration enables hydrogen to be supplied to each of the moving bodies 50 with high efficiency. Additionally, the configuration of the embodiment transports hydrogen by the train 20 and thereby enables a significantly larger amount of hydrogen to be transported, compared with a configuration of transporting hydrogen by a vehicle such as a truck. This configuration transports hydrogen by the train 20 and accordingly enables hydrogen to be transported to the hydrogen station 10 in a systematic manner without being affected by traffic jams.

According to the embodiment, the hydrogen tank 21 is unloaded from the train 20 to the hydrogen station 10. According to a modification, however, the hydrogen tank 21 may be kept on the train 20 and may be connected with the compressor 11 by means of piping to supply hydrogen from the hydrogen tank 21 to the hydraulic accumulator 12.

B. Second Embodiment

Figure 3:
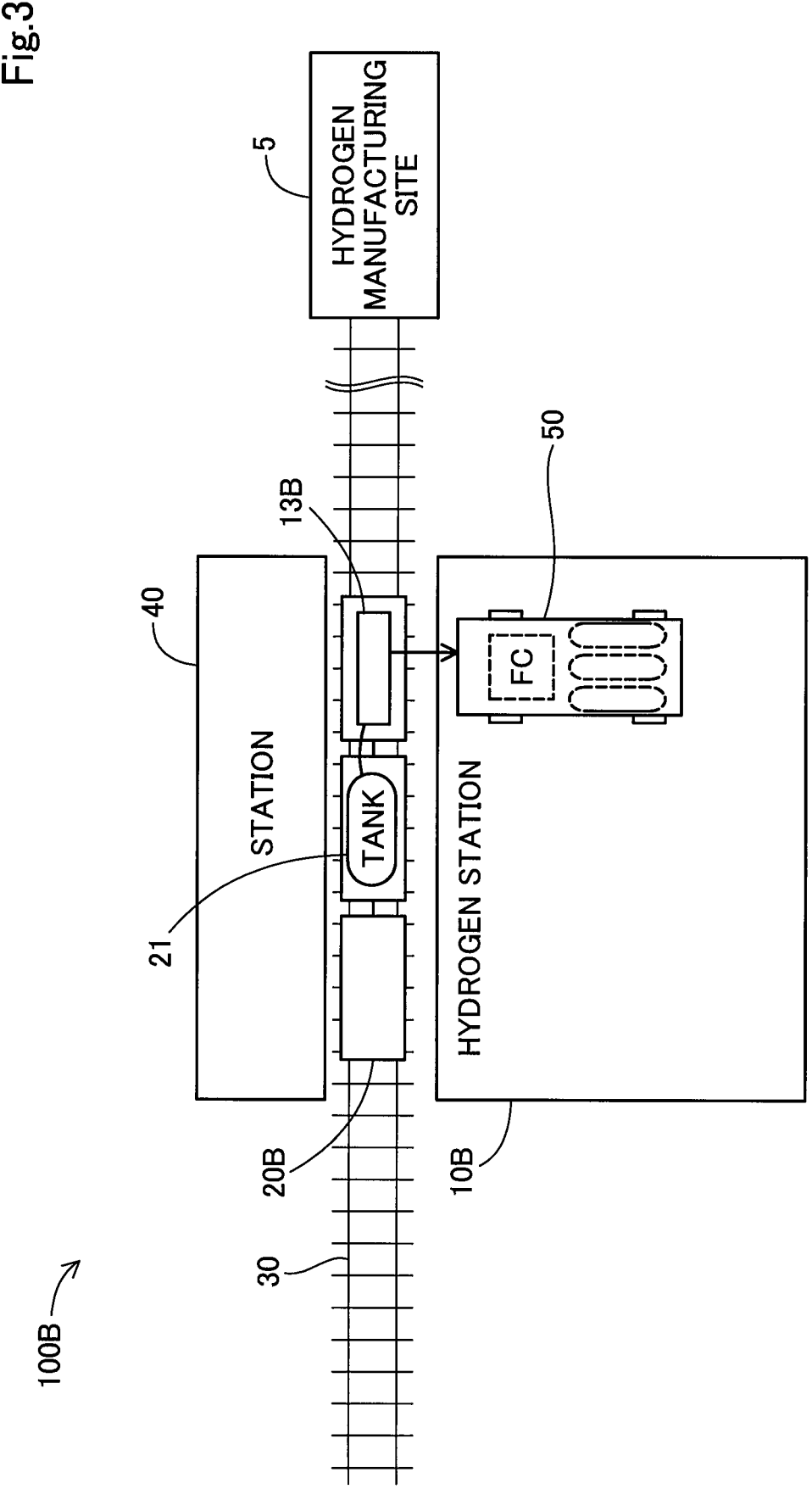
FIG. 3 is a diagram illustrating a hydrogen supply system according to a second embodiment.

FIG. 3 is a diagram illustrating a hydrogen supply system 100B according to a second embodiment. The hydrogen supply system 100B of this embodiment also includes a hydrogen station 10B and a train 20B.

The hydrogen station 10B of this embodiment is not provided with a compressor 11, a hydraulic accumulator 12 or a dispenser 13, unlike the hydrogen station 10 of the first embodiment. According to the embodiment, the train 20B is provided with a dispenser 13B, and hydrogen is supplied directly to the moving body 50 from a hydrogen tank 21 that is mounted on the train 20B and that serves as a hydraulic accumulator, through the dispenser 13B provided on the train 20B. The hydrogen station 10B is, however, provided with legally required structures, for example, fire walls and barriers, like the hydrogen station 10 of the first embodiment.

Figure 4:
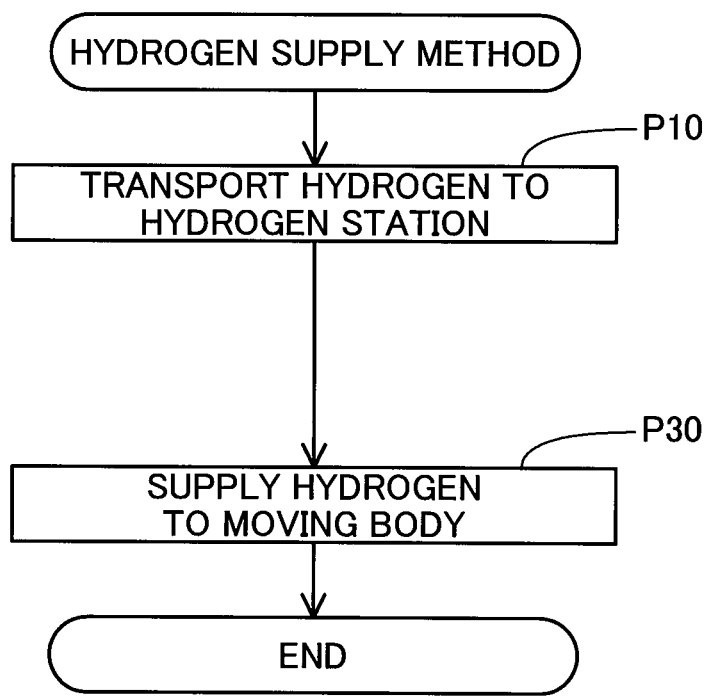
FIG. 4 is a process chart showing a hydrogen supply method according to the second embodiment.

FIG. 4 is a process chart showing a hydrogen supply method according to the second embodiment. Like processes in the process chart of FIG. 4 to those in the process chart of FIG. 2 are expressed by like process numbers. Hydrogen is filled into the hydrogen tank 21 of the train 20B at the hydrogen manufacturing site 5 and is transported to the hydrogen station 10B by the train 20B (process P10). At the hydrogen station 10B, hydrogen is supplied from the hydrogen tank 21 to the moving body 50 by means of a dispenser 13B provided on the train 20B (process P30).

In the hydrogen supply system 100B of the second embodiment described above, the train 20B is provided with the hydrogen tank 21 and the dispenser 13B. This configuration enables hydrogen to be supplied to the moving body 50 without requiring large-scale piping construction. Furthermore, there is no need to place the compressor 11, the hydraulic accumulator 12 and the dispenser 13 at the hydrogen station 10B. This significantly simplifies the equipment of the hydrogen station 10B. Additionally, there is no need to unload the hydrogen tank 21 from the train 20B to the hydrogen station 10B, and there is also no need to supply hydrogen from the hydrogen tank 21 to the hydraulic accumulator 12. Accordingly, this configuration significantly reduces the construction cost of the hydrogen station 10B and enables the hydrogen station 10B to be managed at a low cost.

According to this embodiment, the hydrogen tank 21 and the dispenser 13B may be mounted on different cars of the train 20B like the illustrated example of FIG. 3 or may be mounted on an identical car of the train 20B. A configuration of the train 20B provided with a plurality of dispensers 13B allows hydrogen to be supplied simultaneously to a plurality of moving bodies 50.

C. Third Embodiment

Figure 5:
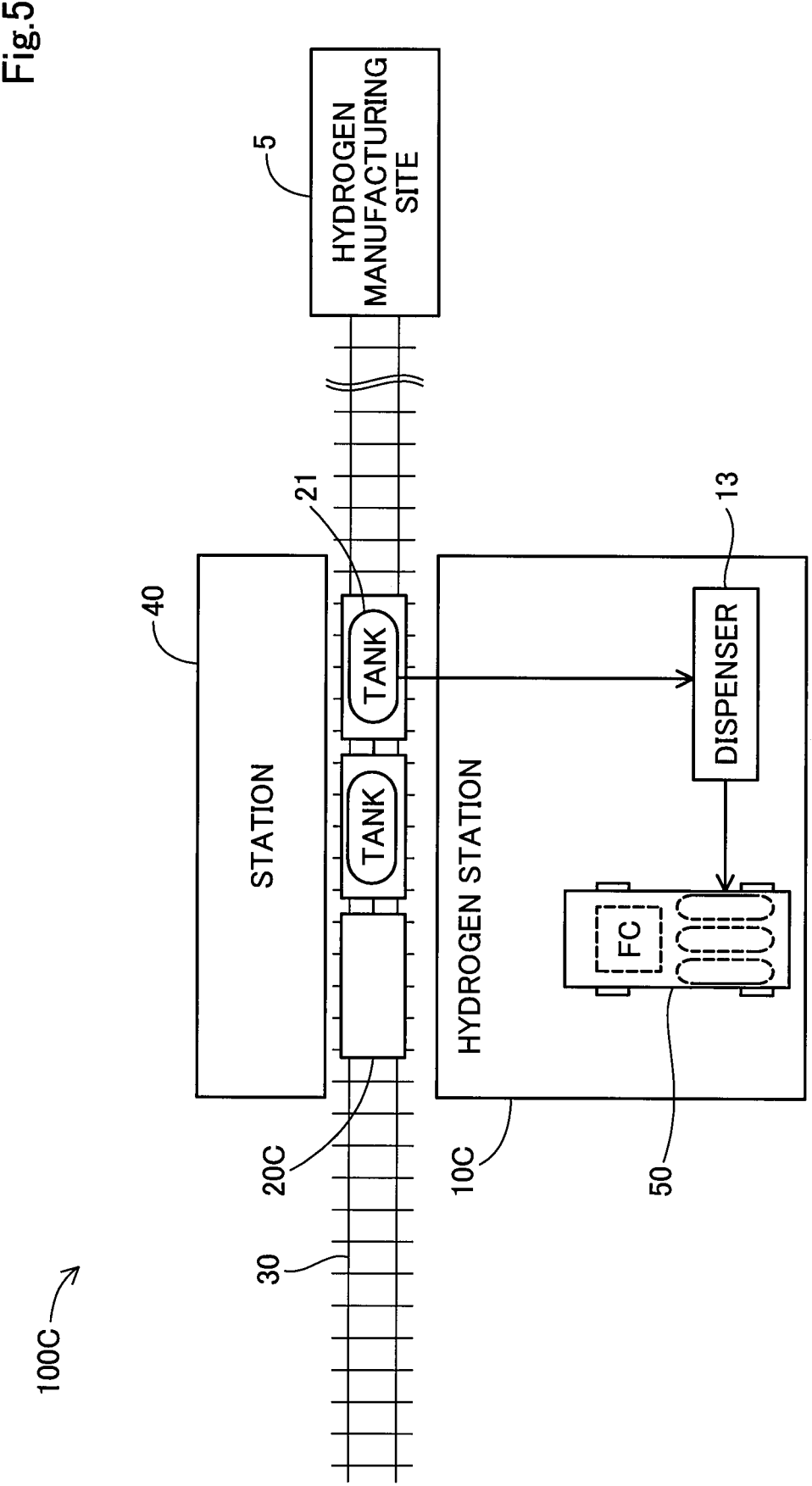
FIG. 5 is a diagram illustrating a hydrogen supply system according to a third embodiment.

FIG. 5 is a diagram illustrating a hydrogen supply system 100C according to a third embodiment. The hydrogen station 10 of the first embodiment is provided with the compressor 11, the hydraulic accumulator 12 and the dispenser 13 as described above. A hydrogen station 10C of this embodiment is, on the other hand, provided with only a dispenser 13. According to this embodiment, while a train 20C is at stop at the station 40, the dispenser 13 is connected with a hydrogen tank 21 that is mounted on the train 20C and that serves as a hydraulic accumulator.

Figure 6:
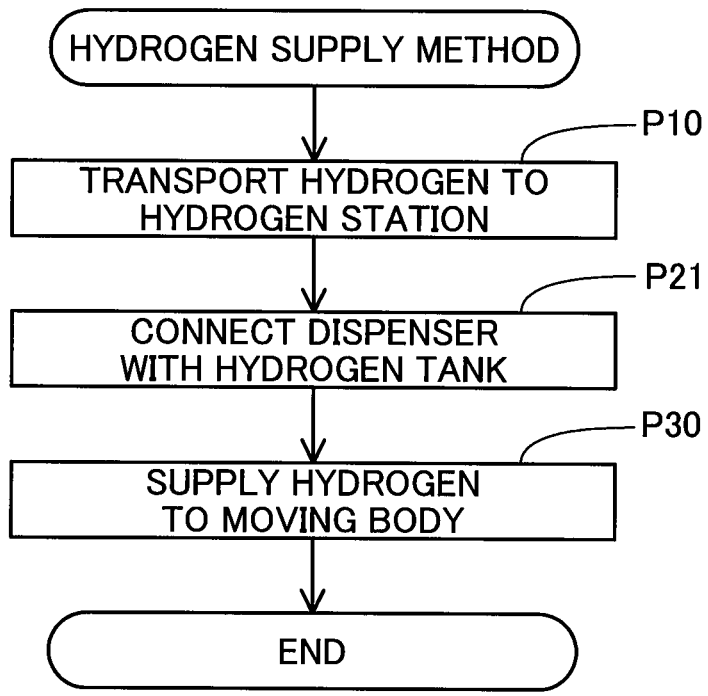
FIG. 6 is a process chart showing a hydrogen supply method according to the third embodiment.

FIG. 6 is a process chart showing a hydrogen supply method according to a third embodiment. Like processes in the process chart of FIG. 6 to those in the process chart of FIG. 2 are expressed by like process numbers. Hydrogen is filled into the hydrogen tank 21 of the train 20C at the hydrogen manufacturing site 5 and is transported to the hydrogen station 10C by the train 20C (process P10). At the hydrogen station 10C, the dispenser 13 is connected with the hydrogen tank 21 provided on the train 20C (process P21). Hydrogen is then supplied from the hydrogen tank 21 to the moving body 50 by means of the dispenser 13 (process P30).

In the hydrogen supply system 100C of the third embodiment described above, there is no need to place the compressor 11 and the hydraulic accumulator 12 at the hydrogen station 10C. This simplifies the equipment of the hydrogen station 10C. Like the second embodiment, there is no need to unload the hydrogen tank 21 from the train 20C to the hydrogen station 100, and there is also no need to supply hydrogen from the hydrogen tank 21 to the hydraulic accumulator 12. Accordingly, this configuration significantly reduces the construction cost of the hydrogen station 10C and enables the hydrogen station 10C to be managed at a low cost.

In the second embodiment and the third embodiment described above, it is preferable that each of the moving bodies 50 is a routine-run vehicle running along a scheduled route. Furthermore, it is preferable that each of the moving bodies 50 is scheduled to reach the hydrogen station 10B or 10C according to a scheduled stop time of the train 20B or 20C at the hydrogen station 10B or 10C. This configuration enables hydrogen to be supplied to each of the moving bodies 50 with high efficiency according to the stop time of the train 20B or 10C at the hydrogen station 10B or 10C.

D. Fourth Embodiment

Figure 7:
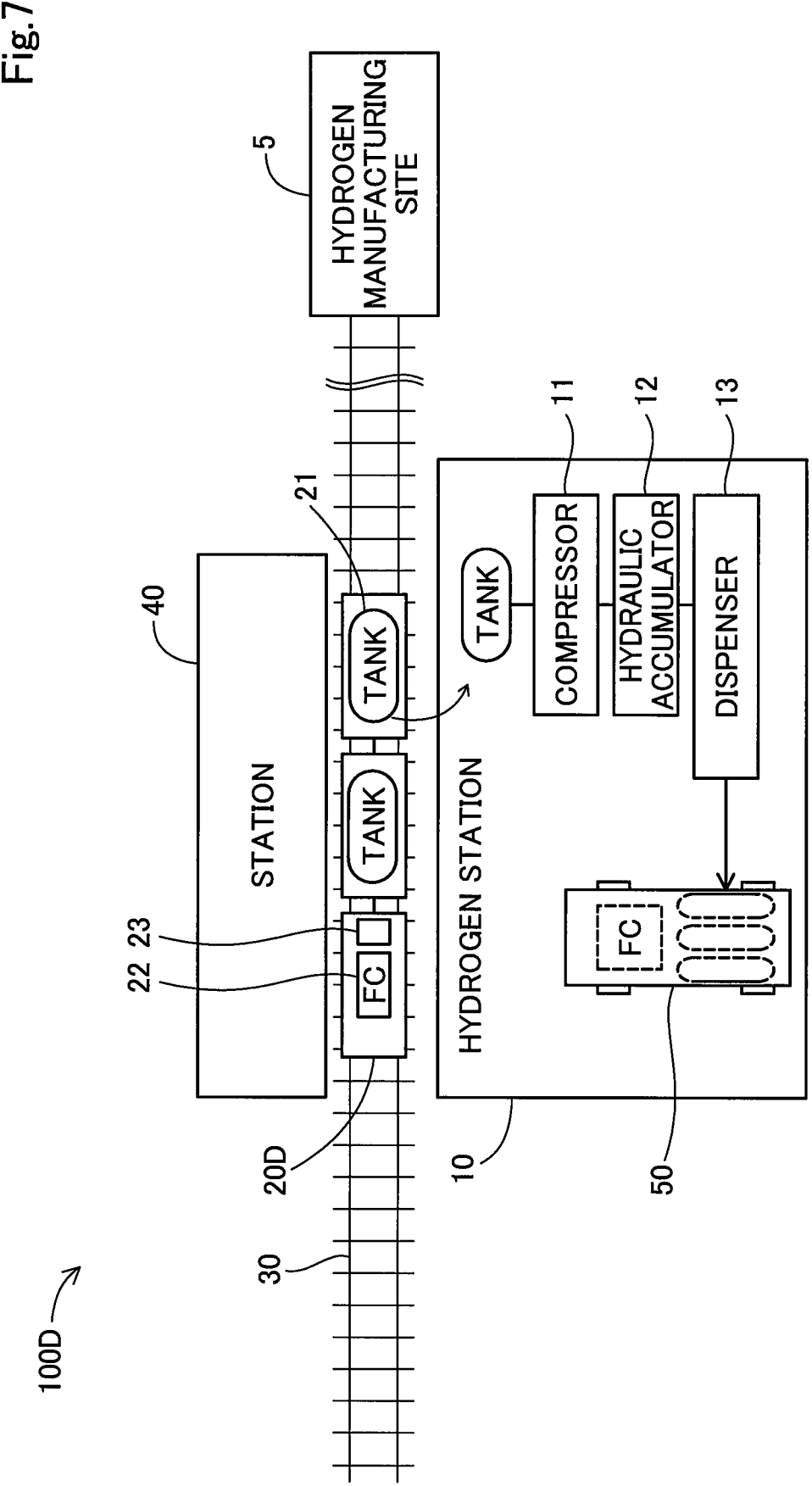
FIG. 7 is a diagram illustrating a hydrogen supply system according to a fourth embodiment.

FIG. 7 is a diagram illustrating a hydrogen supply system 100D according to a fourth embodiment. In the first embodiment described above, the train 20 is an overhead line-type train or a train using an internal combustion engine such as a diesel engine as the power source. A train 20D of this embodiment is, on the other hand, a train using a fuel cell 22 as the electric power source. The train 20D is provided with the fuel cell 22 that is configured to receive a supply of hydrogen from a hydrogen tank 21 mounted on the train 20D or from a hydrogen tank separately mounted on the train 20D for power generation as well as a supply of the air and generate electric power. The generated electric power is used to drive a motor 23 for railroad track running. The train 20D may additionally be provided with a secondary battery that is configured to accumulate the generated electric power therein.

As described above, the hydrogen supply system 100D of the fourth embodiment enables hydrogen to be transported to the hydrogen station 10 even in an area that is not provided with an overhead line. More specifically, according to this embodiment, a large amount of hydrogen is stored in the hydrogen tank 21 mounted on the train 20D. This significantly extends the travelling distance of the train 20D.

Furthermore, the train 20D is driven by the fuel cell 22. This configuration reduces emission of carbon dioxide and significantly improves the environmental performance, compared with a train driven by an internal combustion engine.

Any of the configurations of the first to the third embodiments described above may be applied to the other configuration of the train 20D other than the fuel cell 22 and its relevant component and to the configuration of a hydrogen station 10. For example, the train 20D may not be provided with the dispenser 13 or may be provided with the dispenser 13B.

E. Fifth Embodiment

Figure 8:
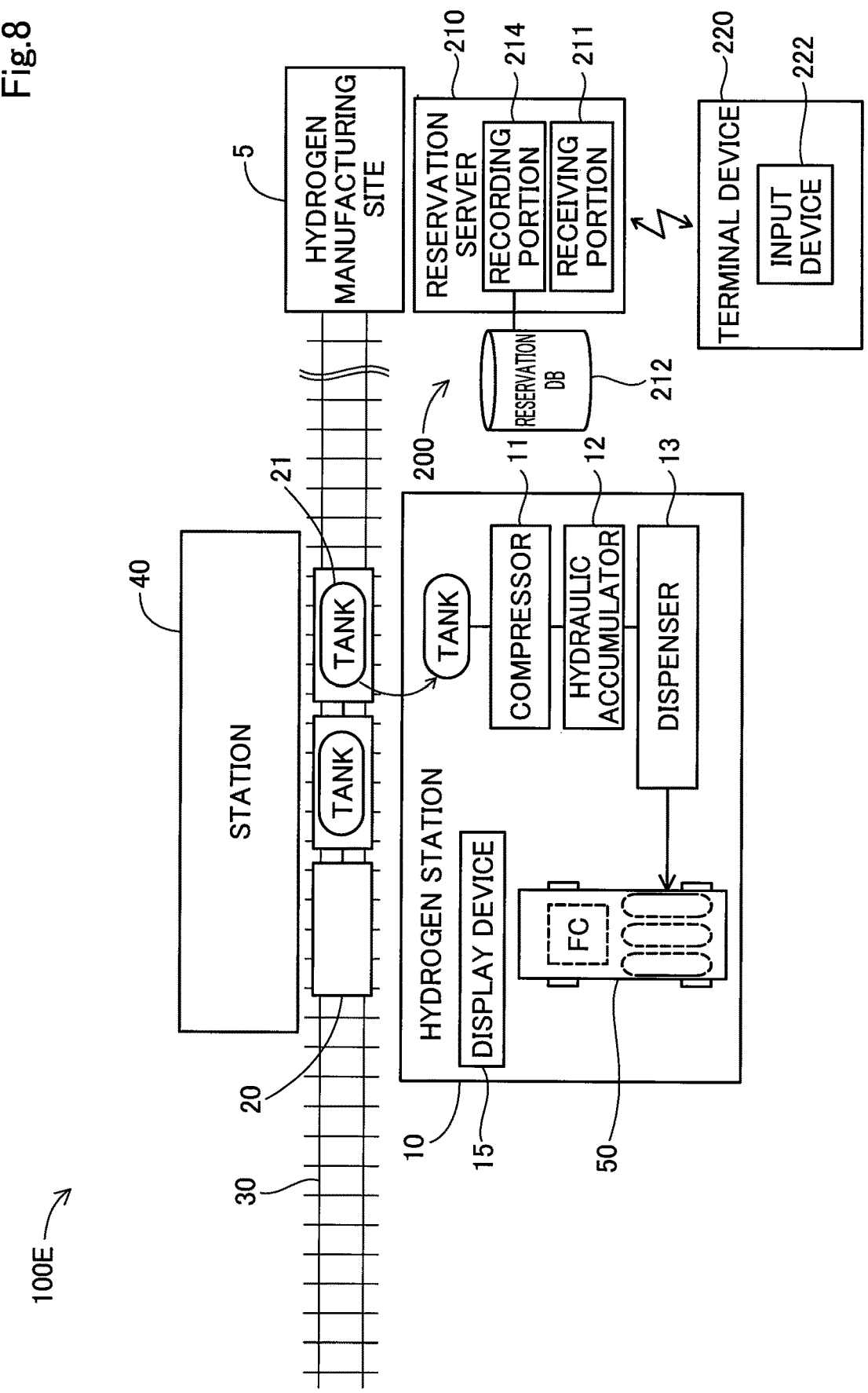
FIG. 8 is a diagram illustrating a hydrogen supply system according to a fifth embodiment.

FIG. 8 is a diagram illustrating a hydrogen supply system 100E according to a fifth embodiment. The hydrogen supply system 100E of this embodiment is provided with a reservation system 200. The reservation system 200 includes a reservation server 210, a terminal device 220 and a display device 15, which are connected with each other via the Internet. Any of the configurations of the first to the fourth embodiments described above may be applied to the configuration of a hydrogen station 10 and the configuration of a train 20 according to the fifth embodiment.

The terminal device 220 is, for example, a cellphone, a smartphone or a computer held by a driver of each of moving bodies 50 or an in-vehicle terminal mounted on each of the moving bodies 50. The terminal device 220 includes an input device 222 configured to receive entry of reservation information that indicates a desired hydrogen station 10 used for hydrogen filling and a desired time of hydrogen filling.

The reservation server 210 is a computer. The reservation server 210 includes a receiving portion 211 configured to make communication with the terminal device 220 and to receive reservation information from the terminal device 220, and a recording portion 214 configured to record the received reservation information into a reservation database 212. The reservation database 212 may be stored in a storage device included in the reservation server 210 or may be stored in another device which the reservation server 210 is accessible to.

The display device 15 is configured by a computer to display the reservation information recorded in the reservation database 212.

FIG. 9 is a flowchart showing a reservation process in the reservation system 200. The terminal device 220 receives a predetermined login operation from the driver of the moving body 50 via the input device 222, such as a touch panel, and gains access to the reservation server 210 (step S100). The terminal device 220 also receives the driver's input of reservation information that indicates a desired hydrogen station 10 used for hydrogen filling and a desired time of hydrogen filling via the input device 222 and sends the input reservation information to the reservation server 210 (step S110). The reservation server 210 receives the reservation information from the terminal device 220 and registers the received reservation information into the reservation database 212 (step S120). When another reservation information indicating the same hydrogen station 10 and the same time as those of the newly received reservation information has already been registered in the reservation database 212, the reservation server 210 may give notice to the terminal device 220 to select another desired hydrogen station 10 or another desired time. In the configuration that hydrogen is supplied from the hydrogen tank 21 that is kept on the train 20B or 20C to the moving body 50 like the second embodiment or the third embodiment described above, the reservation server 210 may accept registration of a reservation only for a time zone when the train 20 is at stop at the hydrogen station 10B or 10C.

When the reservation information is registered in the reservation database 212, the display device 15 placed in each of the hydrogen stations 10 gains access to the reservation database 212 to obtain the reservation information and displays the obtained reservation information on a screen of the display device 15 (step S130). At the hydrogen station 10, hydrogen is supplied to the moving body 50 according to the reservation information displayed on the display device 15.

As described above, the hydrogen supply system 100E of the fifth embodiment enables the driver of each of the moving bodies 50 to use the reservation system 200 and fill hydrogen into the moving body 50 at a desired time at a desired hydrogen station 10.

F. Other Embodiments (F-1) In each of the embodiments described above, a plurality of cars that respectively have hydrogen tanks 21 mounted thereon may be coupled with the train 20 and may be successively uncoupled at respective hydrogen stations 10 located along the railroad track 30 to sequentially deliver the respective hydrogen tanks 21 to the respective hydrogen stations 10. This configuration enables hydrogen to be transported to the plurality of hydrogen stations 10 with high efficiency. In this modification, cars respectively provided with the hydrogen tanks 21 that have been emptied may be successively coupled with a power vehicle or a controlled electric power vehicle running along respective hydrogen stations 10. This ensures efficient collection of the emptied hydrogen tanks 21.

(F-2) In each of the embodiments described above, a car provided with a hydrogen tank 21 may be coupled with part of a local passenger train, and hydrogen may be supplied from the hydrogen tank 21 to the hydrogen station 10 or to the moving body 50 while the local train waits for a limited express or an express train. The configuration of allowing hydrogen to be supplied to the hydrogen station 10 or to the moving body 50 during a waiting time for the express train does not need to change the train operation schedule for supply of hydrogen to the hydrogen station 10 or to the moving body 50.

The present disclosure is not limited to any of the embodiments described above but may be implemented by various other configurations without departing from the scope of the disclosure. For example, the technical features of any of the above embodiments may be replaced or combined appropriately, in order to solve part or all of the problems described above or in order to achieve part or all of the advantageous effects described above. Any of the technical features may be omitted appropriately unless the technical feature is described as essential herein. For example, the present disclosure may be implemented by aspects described below.

(1) According to one aspect of the present disclosure, there is provided a hydrogen supply system. This hydrogen supply system comprises a hydrogen station placed near a railroad track and configured to supply hydrogen to a moving body that is driven with a fuel cell used as an electric power source; and a train provided with a hydrogen tank and configured to run along the railroad track and transport hydrogen to the hydrogen station.

The hydrogen supply system of this aspect enables hydrogen to be transported to the hydrogen station by the train and accordingly does not need large-scale construction to lay pipes for transporting hydrogen.

(2) In the hydrogen supply system of the above aspect, the train may be provided with a dispenser that is configured to supply hydrogen to the moving body at the hydrogen station. The hydrogen supply system of this aspect enables hydrogen to be supplied from the train to the moving body without placing the dispenser at the hydrogen station. This accordingly simplifies the equipment of the hydrogen station.

(3) In the hydrogen supply system of the above aspect, the moving body may be a routine-run vehicle running along a scheduled route and may be scheduled to reach the hydrogen station according to a scheduled stop time of the train at the hydrogen station. This configuration enables hydrogen to be supplied to the moving body with high efficiency.

(4) In the hydrogen supply system of the above aspect, the train may be provided with a fuel cell that is used as an electric power source to run the train along the railroad track. This configuration enables hydrogen to be transported to the hydrogen station even in an area that is not provided with an overhead line.

(5) According to another aspect of the present disclosure, there is provided a train. This train comprises a hydrogen tank; and a dispenser configured to supply hydrogen from the hydrogen tank to a moving body that is driven with a fuel cell used as an electric power source. This configuration enables hydrogen to be supplied to the moving body without requiring large-scale construction.

(6) The train of the above aspect may further comprise a fuel cell; and a motor for railroad track running that is driven with electric power generated by the fuel cell. This configuration enables hydrogen to be transported to even an area that is not provided with an overhead line.

(7) The hydrogen supply system of the above aspect may further comprise a terminal device provided with an input device that is configured to receive an input of reservation information indicating a hydrogen station used to fill hydrogen into the moving body and a time of filling hydrogen into the moving body; a reservation server including a receiving portion configured to make communication with the terminal device and to receive the reservation information from the terminal device and a recording portion configured to record the received reservation information into a reservation database; and a display device configured to display the reservation information recorded in the reservation database. This configuration enables hydrogen to be filled into the moving body at a desired hydrogen station at a desired time.

The present disclosure is not limited to the aspects of the hydrogen supply system and the train described above but may be implemented by any of various other aspects, for example, a hydrogen supply method.

What is claimed is:

1. A hydrogen supply system, comprising:
   a hydrogen station placed near a railroad track and configured to supply hydrogen to a moving body that is driven with a fuel cell used as an electric power source; and
   a train provided with a hydrogen tank and configured to run along the railroad track and transport hydrogen to the hydrogen station.
2. The hydrogen supply system according to claim 1, wherein the train is provided with a dispenser that is configured to supply hydrogen to the moving body at the hydrogen station.
3. The hydrogen supply system according to claim 1, wherein the moving body is a routine-run vehicle running along a scheduled route and is scheduled to reach the hydrogen station according to a scheduled stop time of the train at the hydrogen station.
4. The hydrogen supply system according to claim 1, wherein the train is provided with a fuel cell that is used as an electric power source to run the train along the railroad track.
5. A train, comprising:
   a hydrogen tank on a train car running on railroad track; and
   a dispenser configured to supply hydrogen from the hydrogen tank to a moving body that is driven with a fuel cell used as an electric power source.
6. The train according to claim 5, further comprising:
   a fuel cell; and
   a motor for railroad track running that is driven with electric power generated by the fuel cell.
7. A hydrogen supply method, comprising:
   causing a train that runs along a railroad track and that is provided with a hydrogen tank to transport hydrogen to a hydrogen station placed near the railroad track; and
   supplying hydrogen to a moving body that is driven with a fuel cell used as an electric power source, at the hydrogen station.

* * * * *